May 17, 1932.  E. E. MOE  1,859,044
AIR VEHICLE
Filed June 16, 1930   5 Sheets-Sheet 5

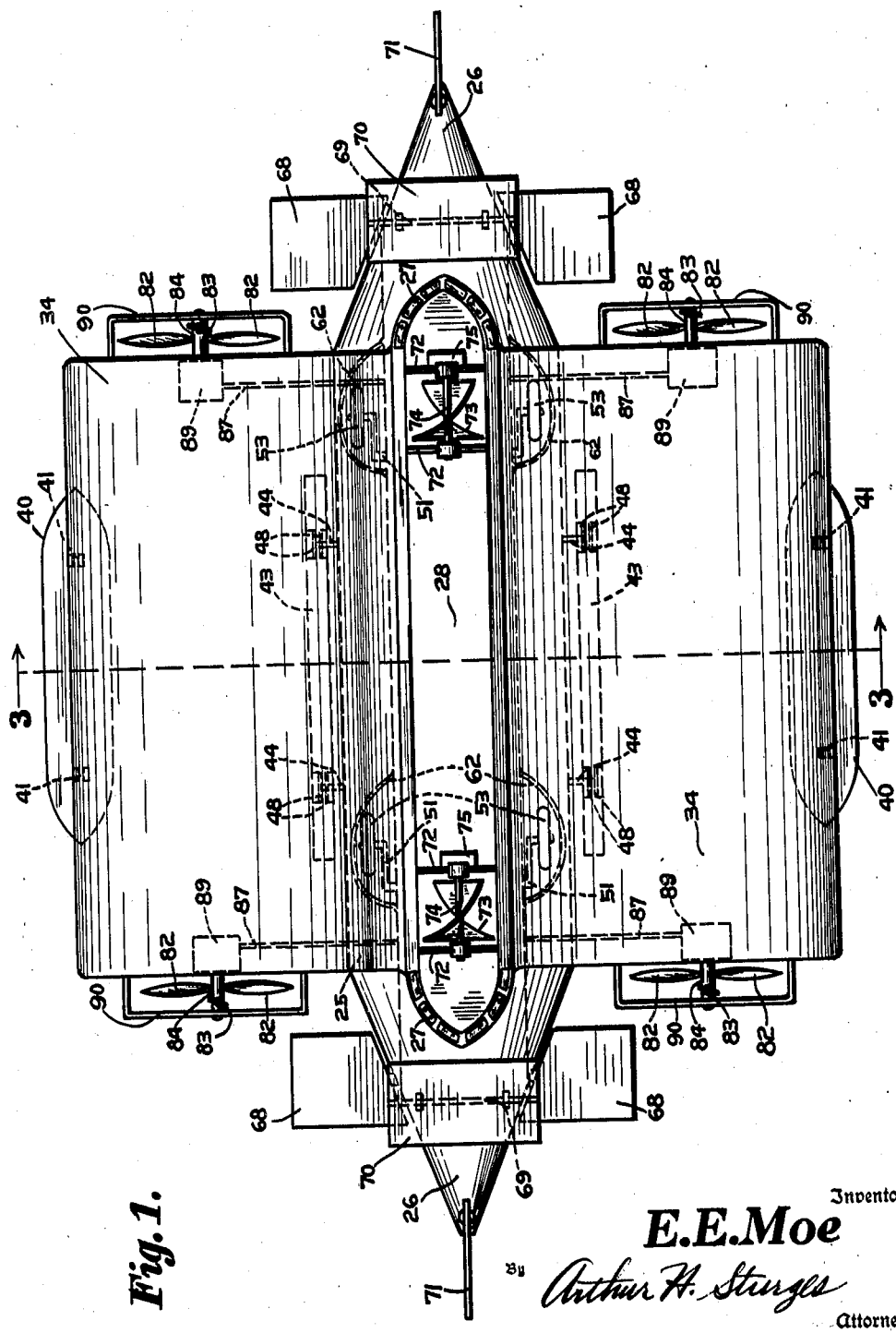

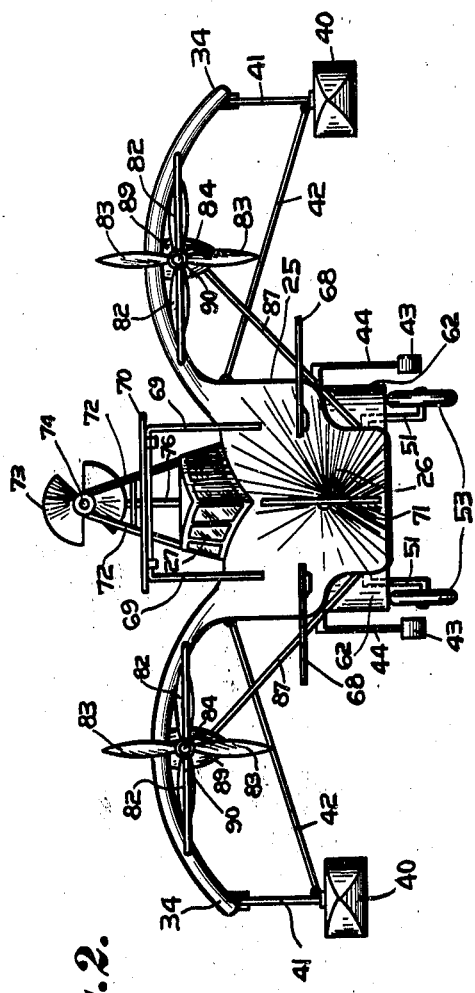
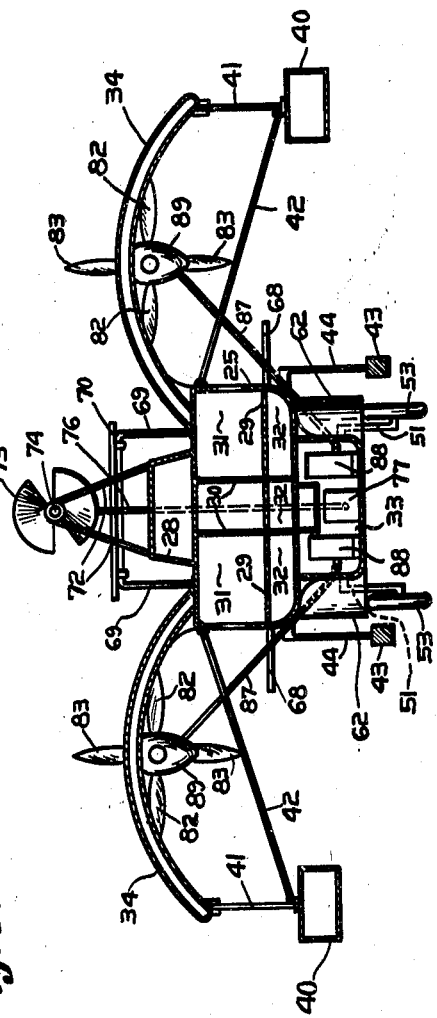

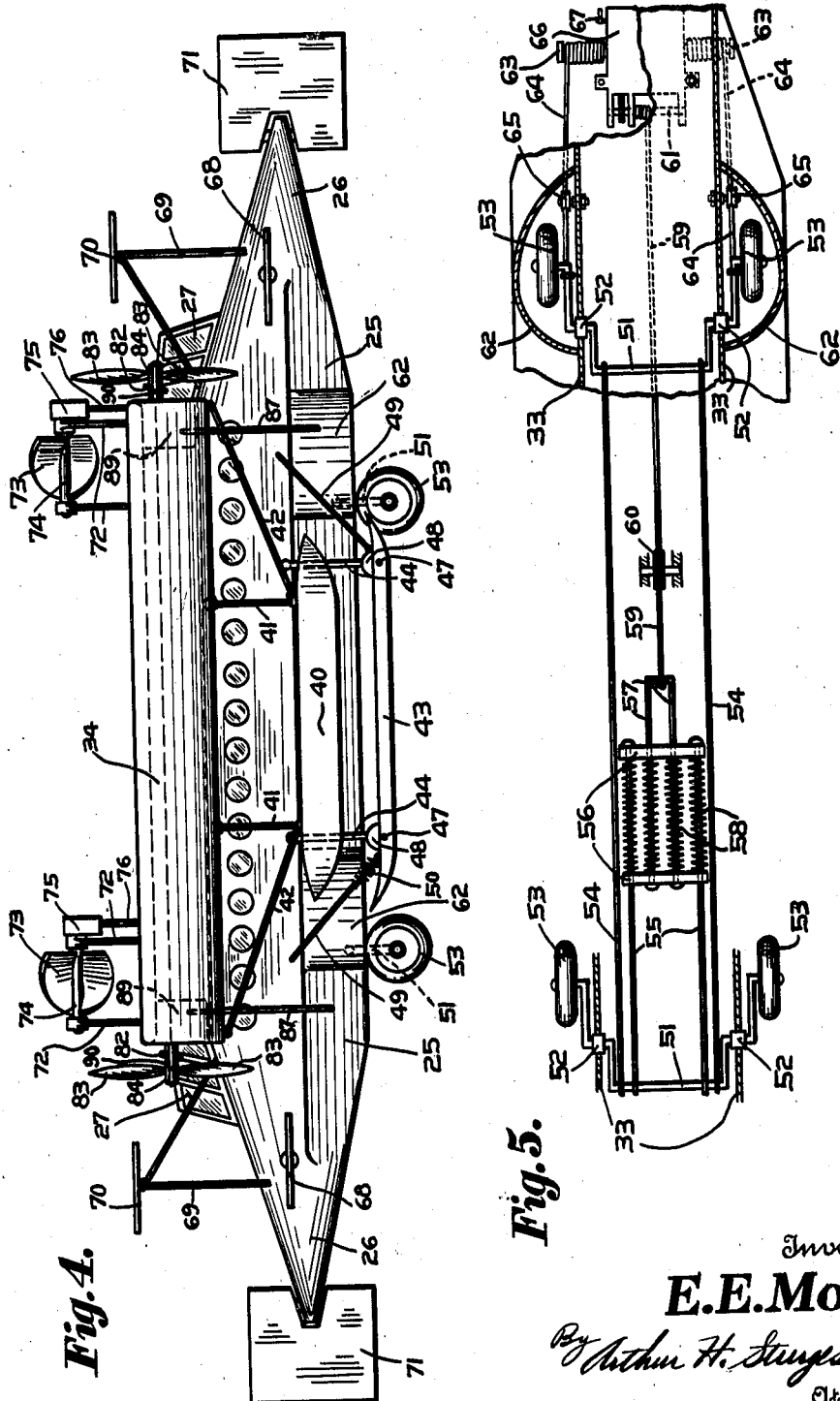

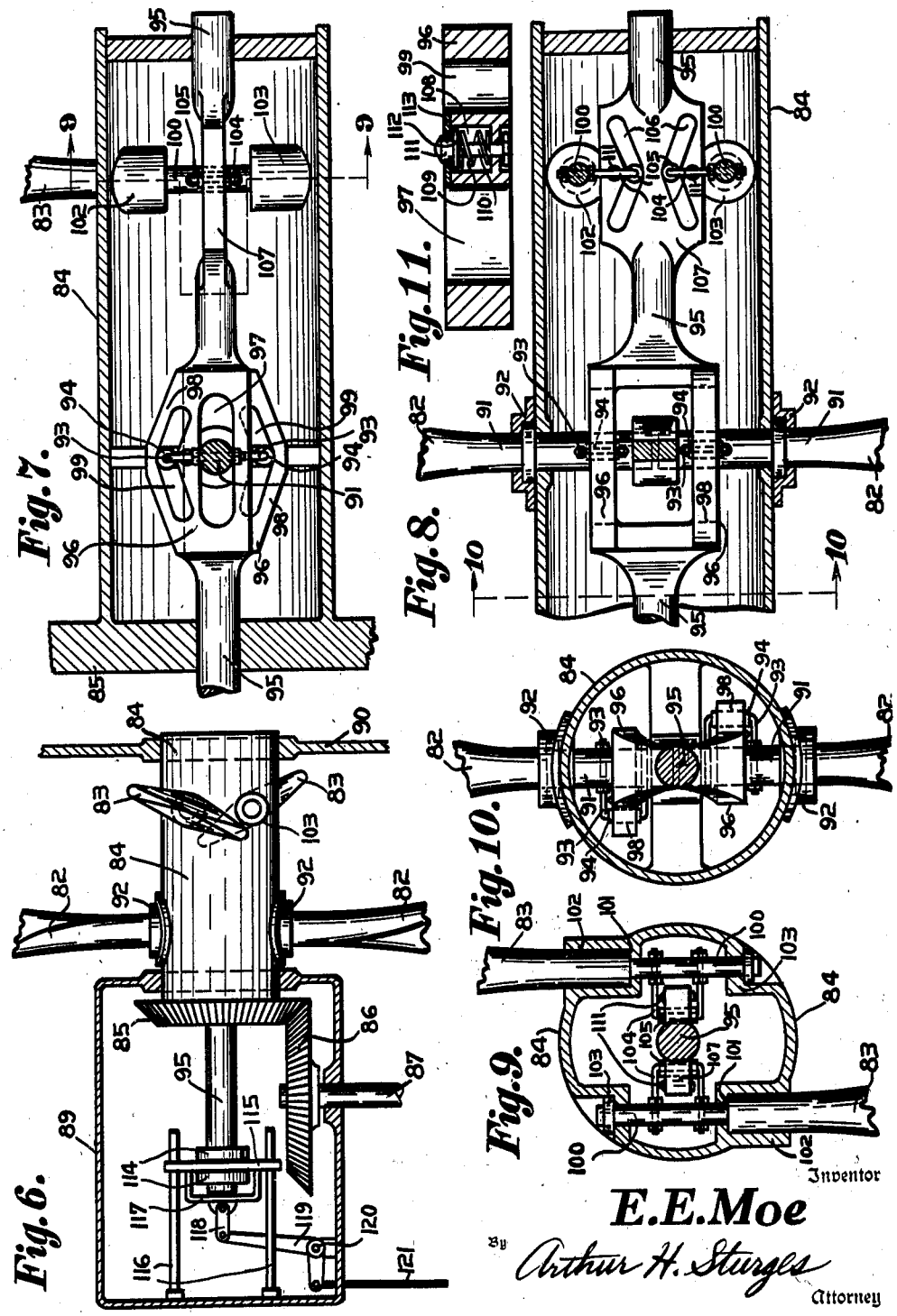

Inventor
E.E.Moe
Arthur H. Sturges
Attorney

Patented May 17, 1932

1,859,044

UNITED STATES PATENT OFFICE

EDWARD E. MOE, OF OMAHA, NEBRASKA

AIR VEHICLE

Application filed June 16, 1930. Serial No. 461,425.

The present invention relates to craft of the amphibian type, and has for an object to provide an airplane so constructed that it is adapted to travel over land and water, through the air and upon ice and snow.

Another object of the invention is to provide an airship of the heavier-than-air type and which is adapted for high speed, which is provided with means enabling the craft to turn susbtantially within its own length, a ship which will travel in either direction, and a construction of craft which has its various parts so arranged relatively to one another as to provide a relatively strong compact and like structure capable of withstanding shock incident to the landing of the craft on the earth or on the water.

The invention also aims at the provision of a novel type of high speed propeller, and a novel type of reversible moderate speed propeller with a novel drive means therefore.

The invention also provides a novel arrangement and construction of landing gear capable of being collapsed or folded out of the way and to support in a novel manner skids arranged relatively to the landing gear as to be disposed in position for use upon the folding or collapsing of the landing gear.

With the foregoing and other objects in view, the invention will be more ful'y described hereinafter, and will be more particularly pointed out in the claims appended hereto.

In the drawings, wherein like symbols refer to like or corresponding parts throughout the several views—

Figure 1 is a top plan view of an airplane of the amphibian type constructed according to the present invention.

Figure 2 is an end elevation of the same.

Figure 3 is a transverse central section taken through the airplane substantially on the line 3—3 of Figure 1.

Figure 4 is a side elevation of the airplane.

Figure 5 is a bottom plan view showing in detail and partly in section the construction and mounting of the landing gear for use on land.

Figure 6 is a detail enlarged sectional view taken through the moderate speed propeller mounting and drive mechanism.

Figure 7 is a further enlarged fragmentary longitudinal section taken through the hub of the moderate speed propeller.

Figure 8 is a similar view taken axially at right angles to Figure 7.

Figure 9 is a transverse section taken through the forward end of the propeller substantially on the line 9—9 of Figure 7.

Figure 10 is a like view but taken substantially on the line 10—10 of Figure 8.

Figure 11 is a fragmentary enlarged section taken through one side of the shiftable member mounted in the propeller hub and showing the friction stop therein.

Figure 13:
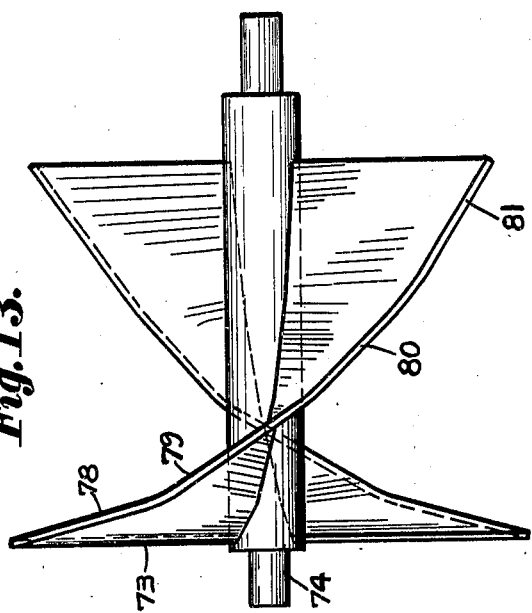
Figure 13 is a side elevation of one of the high speed propellers used.

Referring now to the drawings, and first to Figures 1 to 4, the fuselage or hull 25 of the airplane is of the closed cabin type, extends continuously throughout the length of the craft and has similar tapering substantially conical opposite ends 26. At the top of the cabin 25, and at each end thereof, is a pilot room 27 which merges into the upper portion of the adjacent end 26 and is preferably glass enclosed as shown to admit free and unobstructed view from the room 27. These pilot rooms 27 are interconnected by a longitudinal passage 28 comprising the upper portion of the hull 25.

The hull 25 has a horizontal partition 29 spaced below the top of the hull and providing a floor, and also has a pair of spaced apart longitudinal and vertical partitions 30 which are centrally disposed with respect to the sides of the hull 25 and which intersect the partition 29 and provide quarters or rooms 31 along the opposite sides of the cabin 25. These rooms 31 may of course be sub-divided in any suitable manner as may be found desirable in the carrying of passengers and freight. The intersecting partitions 29 and 30 also provide baggage, freight and storage compartments 32 disposed beneath the floor and beneath the quarters or rooms 31.

The bottom of the cabin 25 also forms the bottom of the storage or baggage spaces 32, and beneath the cabin 25 and extending longitudinally thereof and as a part of the same there is arranged a narrower enclosure 33 which may comprise the engine quarters and space for the fuel and oil supply. The hull 25 may of course be of any suitable construction and may be provided with a suitable covering or skin in the manner well known to those manufacturing airplanes and the like. The vertical partitions 30 provide a longitudinal central passage or hall way therebetween which may be provided with suitable openings leading to the opposite side compartments or rooms 31.

Figure 12:
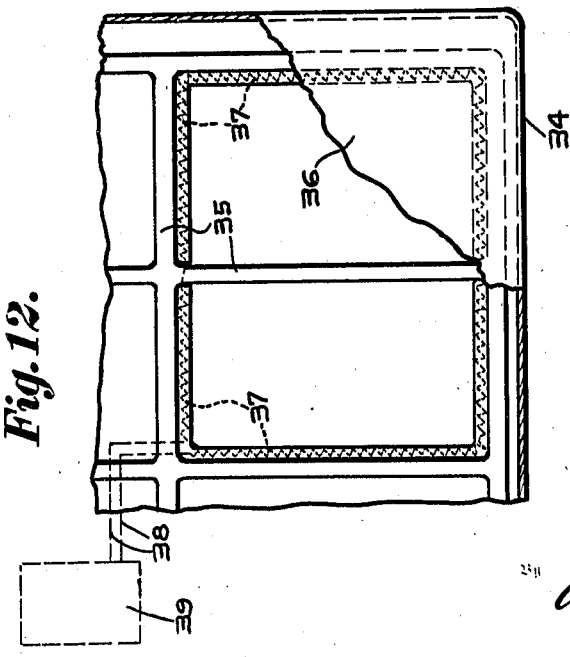
Figure 12 is a fragmentary plan view partly in section of a portion of one of the wings of the airplane, showing the heating device therefor.
Figure 16:
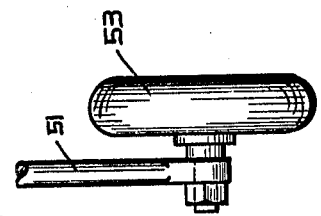
Figure 16 is a fragmentary edge view of one of the landing wheels showing its connection with its crank shaft.

Arched upwardly and extending lengthwise of the hull 25, and extending laterally from the opposite sides of the longitudinal passage 28, is a pair of wings 34. The wings 34 are preferably co-extensive in length with the hull 25 so that the end portions 26 of the hull only project beyond the wings. The wings are preferably of hollow construction as shown to advantage in Figure 3, and as may be best seen from Figure 12 comprise an inner reticulated frame 35 over which is stretched the covering or skin 36, and the spaces within the frame 35 may be provided with resistance coils 37 having opposite ends connected to electric wires 38 leading to a battery 39 or the like for supplying electric energy to the coils 37 to heat the same and consequently heat the wings.

As best shown in Figures 2, 3 and 4, each wing 34 is provided with a pontoon 40 arranged beneath the outer tip portion of the wing 34 and secured thereto by intermediate vertical braces 41 which may be pivotally or otherwise connected to the outer edge or the wing 34 near its front and rear end and which are secured to the pontoon 40, and each pontoon 40 is provided at points adjacent to the lower ends of the vertical braces 41 with inwardly extending inclined braces 42 which are preferably secured to the front and rear portions of the hull 25. The braces 42 thus hold the pontoons 40 not only against longitudinal displacement, but also against movement toward and from the hull.

Figure 15:
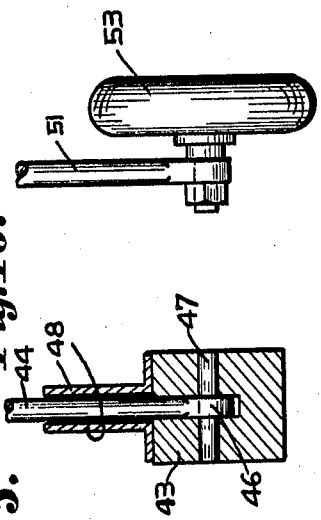
Figure 15 is a transverse section taken centrally through the same.
Figure 14:
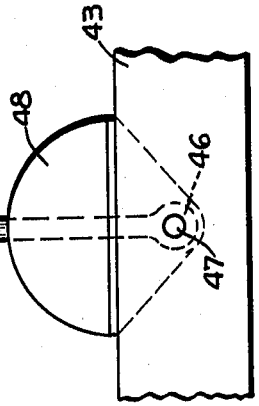
Figure 14 is a fragmentary side elevation of a portion of one of the landing skids, showing the pivotal mounting of the same on its support.

The airplane is equipped with runners 43 which are in the form of skids and which are mounted upon the lower ends of downwardly extending and pivotally mounted arms 44 which are mounted at opposite sides and at the lower portion of the hull 25 as shown to advantage in Figures 2 and 3, and which at their lower ends are connected to the skids 43 as shown in detail in Figures 14 and 15. The lower end of each pivoted arm 44 is enlarged and apertured to provide a pivot eye 46 and a transverse pin 47 is mounted through the adjacent portion of the skid 43 and extends through the eye 46, the skid 43 having an upwardly flaring slot therein leading from about the intermediate portion of the pin 47, as shown to advantage in dotted lines in Figure 14 and for the purpose of admitting of the free swinging movement of the lower end of the arm 44 on the skid.

In order to hold the arm 44 against lateral twisting or strain with respect to the skid 43, the latter is provided with a pair of semi-circular guide and brace plates 48 which bear against the opposite sides of the arm 44 and hold it in true alignment with the pin 47.

While any number of the pivoted arms 47 may be provided for supporting the runners or skids 43, each skid is provided in the present instance with two arms, one near each end of each skid, as clearly shown in Figure 4. In addition to the arms 44, the skids 43 are further reinforced or supported by means of end braces 49 which extend inwardly and upwardly from the opposite end portions of the skids 43 and are secured to the adjacent lower portions of the hull 25. If desired, one or more shock absorbing springs 50 may be interposed in the end braces 49 to permit the arms 44 to swing when subjected to sudden shock or abnormal weight.

In addition to the skids 43, the airplane is provided with landing gear having wheels and which is collapsible or foldable as shown in detail in Figure 5. The hull is provided near each end with a transversely extending double crank shaft 51, and each shaft has its intermediate portion mounted in bearing 52 carried in the opposite sides of the enclosure 33 as best shown in Figures 3 and 5, and each shaft 51 is provided upon its outer end with landing wheels 53.

The inner crank portions of the shaft 51 are connected together by connecting rods 54 to insure the equal and simultaneous swinging movement of the crank shaft 51, and one crank shaft 51 is provided with a pair of tension rods 55 pivotally connected to the inner crank portion thereof and which extend inwardly toward the other crank shaft 51 and pass through a pair of spaced apart cross heads 56. The cross heads 56 also carry therethrough a U-shape connecting rod 57, and springs 58 are arranged between the cross heads 56 and mounted upon the rods 55 and 57 for normally urging the U-shape connecting rod 57 into telescopic relation with respect to the pair of connecting rods 55.

The U-shape connecting rod 57 is provided with a flexible cable 59 which passes toward the opposite end of the enclosure 33 beneath a pulley 60 and is wound upon a drum or shaft 61 having the usual ratchet and pawl for holding the shaft or drum 61 in adjusted position, the drum being adjusted to place the desired tension on the cable 59 and the crank shafts 51.

For the purpose of swinging the crank shafts 51 into position to raise the wheels 53 thereof into position above the skids 43, and into enclosing hoods 62, the enclosure 33 is provided near one end with a pair of drums 63 over which are wound cables 64, the latter being carried downwardly and outwardly over pulleys 65 to the lower end portions of the adjacent crank shafts 51.

The enclosure 33 may also be provided with a suitable power transmission mechanism indicated diagrammatically at 66 which may have a controlling handle 67 for regulating the operation and speed and locking of the various drums 61 and 63.

At opposite ends, the hull 25 may be provided with elevators 68 and, rising from the hull above the elevators 68 with frames 69 upon which are mounted upper elevators 70, the arrangement being identical at opposite ends of the craft so that the craft may be operated in either direction. It will also be noted that arranged at the outer extremities of each of the conical end sections 26 of the hull, there is disposed a vertical rudder 71, and it is of course understood that the elevators 68 and 70, and the rudder 71, may be operated in any well known conventional manner. By arranging the vertical rudder 71 at opposite ends of the craft as shown particularly in Figure 4, it is evident that the craft may be turned completely around within a relatively small space, and within substantially its own length.

The hull 25 is provided at each end with upstanding pairs of brackets 72 which are arranged in pairs and the brackets of each pair are longitudinally spaced apart to accommodate a high speed propeller 73.

As is clearly disclosed in Figure 13 each propeller 73 is provided with a shaft 74 journalled at opposite ends in the brackets 72, and as shown in Figure 4, the rear end of each shaft 74 extends beyond the adjacent brackets 72 and into a gear casing 75 which is connected to the upper end of a drive shaft 76. From Figure 3 it will be noted that the shaft 76 extends downwardly through the hull 25 and into the enclosure 33 where it is connected to a power plant 77 of any suitable type adapted to drive the propellers 73 at a relatively high speed.

Referring again to Figure 13 it will be noted that the forward end of each propeller 73 has a portion 78 which is of small pitch, a second adjoining portion 79 which is of a slightly greater pitch, and at the rear end portion of the propeller 73 forms a continuation of the forward portions thereof and is divided into a section 80 and a rear section 81 which consecutively increase in pitch. The result is that the propeller may be driven at a relatively high rate of speed and without any question of producing back-lash or a vacuum pocket at the center as each succeeding section, 78, 79, 80 and 81 are of increasing pitch, with the result that each section operates within its own zone and is unaffected by the condition of the air set up by the preceding section.

The craft is also provided with moderate speed propellers at opposite ends, and each propeller comprises two pairs of blades 82 and 83 arranged at right angles to one another and projecting substantially radially from a hollow hub 84. The hollow hub 84 has on its inner end a beveled gear wheel 85 which meshes with a second beveled gear wheel 86 carried upon the upper end of a drive shaft 87 which extends downwardly from the propeller to the enclosure 33 beneath the hull 25, and which is connected to a motor 88 or the like which is mounted in the housing 33 as best shown in Figure 3.

The gear wheels 85 and 86 are mounted in a gear case 89 which has a bearing in its forward end in which the hub 84 is rotatably mounted, the outer end of the hub 84 having bearing in a horizontal bracket 90 carried across the edge portion of the adjacent wing 34. One of these moderate speed propellers is located at each end of each wing 34 as clearly shown in Figures 1, 2 and 3, and the shafts 87 which extend from these propellers are carried downwardly and inwardly at the opposite sides of the hull and may have independent motors 88 as shown.

It is desired to reverse the direction of travel of the airplane at times, and to effect this the pitch or angle of inclination of the blades 82 and 83 may be reversed. This is effected by the mechanism disclosed particularly in Figures 6 to 11. The blades 82 on the hub 84 are provided at their inner ends with stems or axles 91 disposed in longitudinal axial alignment and secured in bearings 92 carried in the opposite sides of the hub 84. Each axle 91 is provided with a U-shape clip 93 projecting from one side thereof and carrying upon its outer closed portion a roller 94. It will be noted from Figures 7, 8 and 10 that these clips 93 extend from opposite sides of the axles 91 so that by swinging the clips 93 in one direction lengthwise of the hub 84 the axles 91 will be turned in opposite directions so as to reverse the positions of the blades 82 which extend from the opposite sides of the hub 84 and lie at opposite angles thereto.

Slidably mounted within the hub 84 is a shifting rod 95 provided with an enlarged web 96 at a point opposite to the axles 91.

The web 96 has a longitudinal slot 97 therein through which the axles 91 project, and the web 96 is divided up into spaced parallel sections as shown in Figure 8 providing an open framework and the slot 97 extends in both of the spaced sections and forms a guide for the rod 95 and serves to line the web 96 with the axles 91. The spaced portions of the web 96 are each provided with an edgewise extending portion 98, and the portions 98 extend from opposite edges of the sections and each portion 98 is provided with an angular slot 99 arranged to receive therein each one of the rollers 94 and with the outermost intermediate portion of the slot 99 disposed in transverse alignment with the clips 93 when the blades are in normal position.

The blades 83 of the propeller, which are disposed on the hub 84 at right angles to the blades 82, are each provided with a stem or axle 100 which may comprise reductions of the inner ends of the blades 83 and which form shoulders 101 on the inner ends of the blades adapted to seat in sockets 102 formed in the opposite sides of the hub 84. The sockets 102 are arranged in offset relation in the opposite sides of the hub 84 as clearly shown in Figures 6 and 9, and the hub 84 is also provided in its opposite sides and in line with the sockets 102 with bearing webs 103 adapted to receive the inner ends of the axles 100 and co-operate with the sockets 102 for steadying the blades 83 in their mountings.

Each axle 100 is provided with a clip 104 and the clips 104 extend inwardly toward each other as shown to advantage in Figures 8 and 9. The outer end of each clip carries a roller 105 and the rollers 105 extend through angular slots 106 formed in the edge portions of a web 107 which is carried by the shifting rod 95 in spaced relation to the web 96.

The slots 106 have their angles intermediate their ends and arranged in closely spaced apart relation intermediate the edges of the web 107 so that when the web 107 is in a normal intermediate position, such as shown in Figure 8, the rollers 105 and the clips 104 lie in a single transverse plane. As shown in Figure 11 particularly, in order to yieldingly hold the blades in a normal position and prevent the accidental varying or displacement of the same, the adjacent web, such as the web 96 shown in Figure 11, may be provided between the slot 97 and the angular slot 99 with a socket opening 108 in which is seated a spring 109 which surrounds a stem 110 carrying a plunger 111 on its outer end, the plunger having a disc or shoulder 112 adapted to bear against a face plate 113 countersunk in the adjacent face of the web 96 and over which the adjacent clip 93 traverses.

The plunger 111 has a cam head projecting therefrom adapted to engage beneath the arm of the clip 93 to depress the plunger 111 against the spring 109 and thus tension the clip when it is positioned directly over the plunger as shown in Figure 7. Of course this plunger and its parts may be used in connection with each of the clips, 93 and 104, the latter clips being shown in Figure 8.

The rod 95 may be shifted by the following described mechanism:

The shifting rod 95 extends outwardly from the hub 84 into the gear case 89 and is provided on its end with a pair of spaced collars 114 between which is rotatably mounted a disc 115 suitably apertured for the reception therethrough of a pair of guide rods 116 carried on the end of the case 89. The disc 115 carries a loop 117 which extends around the free end of the rod 95 and over the adjacent collar 114 and which at its intermediate portion is pivotally connected to a link 118 carried upon the outer end of a bell crank lever 119 pivoted at 120 in the case 89. One end of the lever 119 is connected to a shifting rod 121 which extends downwardly with the shaft 87, or in any desired direction for regulating the control of the intermediate speed propellers.

From the above it is thought that the operation and the control of the airplane will be apparent. When the airplane is to be propelled at a moderate speed in one direction it is only necessary to adjust the shifting rod 95 so as to turn the blades 82 and 83 of the intermediate propellers at the desired angle and in the desired direction. The drive shafts 87 are now driven from the motors 88 and the hubs 84 are turned. It is apparent that by variation in the angular position of the blades 82 and 83 that various speeds of the aircraft may be obtained relative to a fixed speed of rotation of the propellers and consequently the speed of the airplane may be controlled by the shifting of the rod 95.

As the craft is provided with a vertical rudder 71 on each end, it is apparent that by the reverse manipulation of these rudders the craft may be turned completely around within a relatively short distance, practically within its own length.

When it is desired to drive the craft at a relatively high speed the propeller 73 are brought into operation through the drive shafts 76 and the propellers 73, having the stepped portions 78, 79, 80 and 81 insure a consecutive or constant torque of the propellers 73 with an increasing drive incident to the change in pitch and consequently the propellers have an increasing forward thrust and transmit this movement to the aircraft.

When it is desired to land the aircraft on the ground and use the running wheels, the crank shafts 51 are swung into substantially vertical position by operation of the drum 61 and by the release of the drums 63 so that the wheels are forced downwardly and outwardly from the hoods 62 and project below the skids 43, as clearly shown in Figures 2, 3 and 4. By reversing the operation of the drums 61 and 63 the wheels may be quickly and easily raised into their hoods 62 out of the way so that the skids 43 may come into operative position, such as when it is desired to make a landing on snow and ice.

The pontoons 40 serve to equalize the airplane when it alights on water.

It is obvious that various changes and modifications may be made in the details of construction and design of the above specifically described embodiment of this invention without departing from the spirit thereof, such changes and modifications being restricted only by the scope of the following claims.

What is claimed is:—

1. An airplane comprising a hull, wings extending outwardly from the opposite sides of the hull, said hull having opposite tapering end portions extending beyond the wings, a vertical rudder carried upon the outer end of each tapering end of the hull, pontoons carried upon the outer ends of said wings, landing gear carried by the hull, and means mounted on the hull for propelling the airplane.

2. An airplane comprising a hull tapering at opposite ends, a vertical rudder mounted upon each end of the hull, wings extending outwardly from the hull for supporting the same, moderate speed propellers mounted on the wings, means for driving said propellers, high speed propellers mounted on the hull between the wings, independent means for driving the high speed propellers, and landing gear carried by the hull.

3. An airplane comprising a hull having tapering opposite ends, a vertical rudder on each end of the hull, moderate speed propellers, wings projecting outwardly in opposite directions from the hull and being arched upwardly and supporting said propellers at their intermediate arched portions, drive means in the hull connected to said propellers for operating the same, a second drive means, high speed propellers, brackets carried by the hull between the wings and extending upwardly for supporting the high speed propellers in a plane above the plane of said wings, and means for changing the angle of pitch of said first propellers.

4. An airplane comprising a hull, wings extending laterally in opposite directions from the hull and being arched upwardly therefrom, moderate speed propellers mounted on the wings at opposite ends thereof and having adjustable blades, means for driving said propellers, independent means for shifting said blades to change the pitch thereof, and independent high speed propellers carried by the hull in spaced relation to said first propellers.

5. An airplane comprising a hull having tapering opposite ends, vertical rudders mounted on said opposite ends of the hull, elevators arranged at opposite sides of the tapering ends of the hull and inwardly of the vertical rudders, bracket frames rising from the opposite ends of the hull, upper elevators mounted on said bracket frames immediately over the tapering ends of the hull and lying in position between the said first elevators, means for propelling the hull, wings projecting outwardly from the hull, and landing gear carried by the hull.

In testimony whereof I have affixed my signature.

EDWARD E. MOE.